United States Patent
Steinert et al.

(10) Patent No.: US 11,614,143 B2
(45) Date of Patent: Mar. 28, 2023

(54) TOOTHED BELT WITH INTEGRATED SENSOR SYSTEM

(71) Applicants: BRECO Antriebstechnik Breher GmbH & Co. KG, Porta Westfalica (DE); Technische Universität Darmstadt, Darmstadt (DE)

(72) Inventors: Thomas Steinert, Bad Oeynhausen (DE); Dominik Großkurth, Wiesbaden (DE)

(73) Assignees: TECHNISCHE UNIVERSITÄT DARMSTADT, Darmstadt (DE); BRECO ANTRIEBSTECHNIK BREHER GMBH & CO. KG, Porta Westfalica (DE)

( * ) Notice: Subject to any disclaimer, the term of this patent is extended or adjusted under 35 U.S.C. 154(b) by 371 days.

(21) Appl. No.: 17/116,106

(22) Filed: Dec. 9, 2020

(65) Prior Publication Data

US 2021/0190175 A1  Jun. 24, 2021

(30) Foreign Application Priority Data

Dec. 20, 2019  (EP) .................. 19 218 820

(51) Int. Cl.
*F16G 1/28*  (2006.01)
*F16G 1/16*  (2006.01)
(Continued)

(52) U.S. Cl.
CPC ................. *F16G 1/28* (2013.01); *F16G 1/16* (2013.01); *G01D 7/00* (2013.01); *G01D 11/245* (2013.01)

(58) Field of Classification Search
CPC .............. F16G 1/28; F16G 1/16; G01D 11/24
(Continued)

(56) References Cited

U.S. PATENT DOCUMENTS

| 6,523,400 B1 * | 2/2003 | Ahmed | G01M 13/023 |
|---|---|---|---|
| | | | 73/114.77 |
| 2009/0178902 A1 * | 7/2009 | Lynn | B65G 43/02 |
| | | | 198/810.02 |
| 2021/0102602 A1 * | 4/2021 | Sattler | B29C 43/18 |

FOREIGN PATENT DOCUMENTS

| DE | 102017104402 A1 * | 9/2017 | ............. B29C 45/14 |
|---|---|---|---|
| DE | 102017208074 | 11/2018 | |

(Continued)

OTHER PUBLICATIONS

European Search Report filed in EP 19218820 dated Jun. 22, 2020.

*Primary Examiner* — Michael R Mansen
*Assistant Examiner* — Stephen A Reed
(74) *Attorney, Agent, or Firm* — Rankin, Hill & Clark LLP

(57) ABSTRACT

A toothed belt includes at least one tension member and a plastics material matrix which at least partially encases the tension member. The at least one tension member extends in the plastics material matrix in a running direction and teeth of the toothed belt are formed transversely to the running direction in the plastics material matrix. The tension member is formed from an electrically conductive material and the plastics material matrix is formed from an electrically insulating material. The toothed belt has at least one electronic component which is embedded in the plastics material matrix and has at least one sensor which detects data on a condition parameter of the toothed belt. The at least one electronic component is coupled to the tension member via at least two voltage taps to tap a voltage induced in the tension member to supply the at least one electronic component with power.

11 Claims, 2 Drawing Sheets

(51) Int. Cl.
*G01D 7/00* (2006.01)
*G01D 11/24* (2006.01)

(58) Field of Classification Search
USPC .......................................................... 73/116
See application file for complete search history.

(56) References Cited

FOREIGN PATENT DOCUMENTS

| | | | |
|---|---|---|---|
| DE | 102017208074 A1 * | 11/2018 | ............... F16G 1/00 |
| JP | 2010-189168 | 9/2010 | |
| JP | 2011-510296 | 3/2011 | |
| JP | 2019-108979 | 7/2019 | |
| KR | 0169630 B1 * | 1/1999 | ............. F16H 17/08 |

* cited by examiner

TOOTHED BELT WITH INTEGRATED SENSOR SYSTEM

The application relates to a toothed belt with an electronic sensor system integrated into the toothed belt. In particular, the invention relates to a toothed belt having at least one tension member and a plastics material matrix at least partially encasing the tension member. The at least one tension member extends within the plastics material matrix in a running direction of the toothed belt. Teeth of the toothed belt are formed in the plastics material matrix transversely to the running direction. The tension member is made of an electrically conductive material and the plastics material matrix consists of an electrically insulating material. The toothed belt has at least one electronic component with at least one sensor, wherein the electronic component is embedded in the plastics material matrix or in a layer, e.g., is attached as a thin film on the back of the belt. The sensor detects data on a condition parameter of the toothed belt.

The detection of condition data or condition parameters in machine elements, products, and processes is generally known. Toothed belts are often not monitored due to their mechanical stress and installation position; instead, as wear parts with a long service life, they are usually the subject of preventive replacement, even if there is no precise knowledge of the state of use and wear of the toothed belt. As a result, belts that do not actually need to be replaced are replaced too early and, on the other hand, belts that have aged prematurely are not recognized as worth replacing. If the belt fails, the latter can lead to process stoppages and cause considerable damage and costs. But also with toothed belts, the replacement of which is associated with significant costs, so that storage in the sense of preventive maintenance is prohibited due to the capital commitment or the belt replacement takes considerable time, a better knowledge of the condition of the belt would be helpful.

The prior art, for example DE 10 2017 104 402 A1, discloses a method for producing toothed belts. It is also proposed there to embed a sensor in the toothed belt, which sensor detects specific properties of the toothed belt and forwards them to a signal detection device. Due to the mechanical stress on a toothed belt, the arrangement of electronics within a belt is prone to problems, especially if the electronics are to extend over regions of the toothed belt that are exposed to significant tensile and bending loads. There is an effort to embed a sensor system in a toothed belt in the most reliable way possible and to supply it with energy.

The object of the invention is therefore to improve a toothed belt of the type mentioned at the outset in such a way that a robust and permanent energy supply for embedded electronic components is possible.

The object is achieved by a toothed belt with the features of claim 1.

According to the invention, the at least one electronic component embedded in the toothed belt is coupled to the sensor via at least two voltage taps with the mechanical tension member. A voltage induced in the tension member is tapped to supply the at least one electronic component with power.

According to the invention, a double benefit of the embedded, electrically conductive tension member is achieved, which rotates in the toothed belt. The inductive coupling of a voltage into the tension member is carried out by a means external to the toothed belt, with voltage being induced in the tension member according to the operating principle of a transformer. The sensor in the electronic component of the toothed belt is supplied by the induced voltage and can carry out its detection of condition parameters, for example temperature values or acceleration values. If necessary, the electronic component can then store the data from the sensor in a writable memory or transmit it wirelessly to external locations. A temperature measurement provides information about the wear of the belt, for example, while acceleration values, for example, in accordance with a Fast Fourier Transformation (FFT) can be converted to natural bending frequencies and thus, for example, indicate loss of preload force and also show fatigue. The inductive transmission and coupling of the voltage into the tension member is carried out in a non-contact manner, so that the toothed belt can always work without any mechanical influence. Since the tension member is designed for mechanical loads, the use of the tension member as an induction coil does not require any special mechanical design. In addition, the dual use ensures that the supply is provided by components that are available anyway, so that no separate supply coils need to be embedded in the plastics material matrix.

In order to allow for inductive coupling and supply, a primary coil can be arranged near the toothed belt, which builds up an alternating magnetic field that penetrates the belt. Such a changing magnetic field can also be built up differently, for example, by moving permanent magnets. These can, for example, be attached to moving parts of an apparatus in which the toothed belt is arranged. This primary coil is supplied with AC voltage from a voltage supply. The magnetic field created in this way in the primary coil has to reach through the coil formed by the tension member in order to induce a voltage in the winding of the tension member. This creates a kind of transformer from the primary coil and the tension member. The external coil can be provided with a coil core in order to direct and strengthen the magnetic field lines and the magnetic flux through the tension member of the toothed belt.

The basic concepts of a transformer and their physical and technical description as well as size calculation are well known, so that an explanation in this regard is dispensed with at this point. It is substantial that the tension member of the toothed belt is used as a secondary coil of a transformer, which is energized via an external, stationary excitation device, e.g. a primary coil, whereby voltage is induced in the tension member and thus the toothed belt.

In particular, it is known that the level of the induced voltage depends, on the one hand, on the level of the primary voltage applied to the external excitation device and, on the other hand, on the ratio of the number of windings of the primary coil and secondary coil, i.e., the tension member. If a simple detection sensor system is arranged in the electronic component of the toothed belt without providing a wireless transmission of the detected values, usually even low power is sufficient to supply the corresponding sensor system with power. Then, it may be sufficient to use only one winding of the tension member in the toothed belt as a secondary coil (number of turns 1). However, a plurality of windings of the tension member can also be used as a secondary coil. If only low electrical power is required, even alternating electromagnetic fields, for example, interference fields, which are already present in the region of the toothed belt, are used as an induction source and thus an energy source. In view of the lack of control over the frequency and alignment of these interference fields, the design of the secondary side, i.e., the tension member and the electronics, could be adapted to these fields with regard to the resonance frequency, if the coupling is not sufficient. In the case of a targeted induction with an excitation device provided, for example, in the form of a primary coil, however, this can be adapted to the design of the toothed belt and optimized in terms of its alignment and supply frequency.

The invention is basically applicable to non-endless toothed belts, provided that the electrical coupling of the tension member with the electronic component together forms an endless arrangement, i.e., at least one coil turn is present on the secondary side. This can, for example, be achieved by coupling a finite toothed belt with two ends to a driven element (for example, a carriage in a guide) and by coupling the ends of one or more tension members of the belt to the electronic component, so that this electronic component is the connecting element.

However, the toothed belt is preferably designed as an endless toothed belt. Such an endless toothed belt has a plurality of single circumferential tension members or also a spirally wound tension member which rotates multiple times. The closed shape of the endless toothed belt forms a coil arrangement on the secondary side, which is particularly easy to handle and mechanically encapsulated and resilient.

In a preferred embodiment of the invention, the at least one electronic component is arranged in one of the teeth of the toothed belt.

The placement of the electronic components in one of the teeth of the toothed belt initially allows for good utilization of the installation space in the toothed belt body, since the teeth tend to provide large-volume material portions.

Furthermore, the tensile and bending stresses on the electronic components are then minimal, since the teeth run transversely to the load direction and the electronic system is arranged in an elongated arrangement (for example, on a narrow board) along the tooth direction. If the electronic component is aligned along this tooth extension, the tensile forces only act over a comparatively short portion, namely along the width of the electronic component, which runs in the direction of rotation of the toothed belt and transversely to the tooth extension.

In a preferred embodiment of the invention, at least one temperature sensor or one acceleration sensor is provided as a sensor within the electronic component.

As already described above, temperature data and acceleration data give good information about the wear of the belt, as well as about the load on the belt, in order to calculate a lifetime prognosis. The data can be used at any time both for calculating a probable remaining service life and for detecting the current condition of the belt. In particular, comparisons with historical measurement data can provide information about the change in the corresponding parameters and thus also reveal a deterioration in the condition of the belt.

It is also possible to couple components for resistance measurement to the tension member. Resistance measurements of this kind can help to identify damage to the tension member at an early stage, as fiber cracks or strains and changes in cross-section lead to changes in the electrical resistance.

In a preferred embodiment of the invention, the electronic component has a wireless communication device which transmits data from the sensor in an electromagnetic communication signal.

Such a belt can transmit the current and possibly also the historical measurement data wirelessly, which can either happen during operation or in a maintenance state. For this purpose, for example, a reader is brought near the belt in order to establish communication according to any standard of short-range radio technology, such as a Bluetooth standard or the NFC standard.

In this way, a particularly convenient detection of the characteristic belt parameters is possible. However, if there is not enough energy available for such a wireless connection, an interface can be provided on the belt via appropriate galvanic contacts or plug connectors, via which a reader can query the required data.

In a further development of the invention, the toothed belt in the electronic component has an energy storage and an associated charging circuit in order to charge the energy storage under voltage supply by the induced voltage in the tension member, the energy storage being coupled to supply the sensor.

The arrangement of an energy storage in the toothed belt, for example in the form of a capacitor, allows for the detection of belt parameters by the sensor even during times when no voltage is induced in the belt. This makes it possible to bridge downtimes of the external supply or to switch it on specifically only for certain periods, for example in order not to disturb other control processes or detections by the field provided.

It is particularly preferred if the tension member is formed in the plastics material matrix in such a way that it has a plurality of revolutions along the running direction and extends along a helical line around an axis transverse to the direction of travel, so that the tension member in the plastics material matrix forms a coil having a plurality of windings.

Such a design can be formed on the one hand by surrounding a spirally wound tension member with a plastics material matrix, and on the other hand by connecting a plurality of loop-shaped tension members at the end of a toothed belt to form an infinite toothed belt in pairs to form the helical coil. Accordingly, toothed belts having metallic tension members can be manufactured in a variety of ways and used according to the invention.

In an arrangement for using a toothed belt according to the invention, the toothed belt is coupled to a drive and clamped along a transport path. A supply coil supplied with AC voltage is placed in a stationary manner along the transport path and adjacent to the toothed belt, the supply coil having a coil core. The coil core engages around the toothed belt along the transport path, at least in portions, or engages over or under it, so that a transformer arrangement is formed by the supply coil, the coil core, and the tension member.

The placement of the supply coil and the arrangement and design of a coil core depend on the field of application of the toothed belt, since this supply device should not impair the proper operation and the mechanical effective range of the toothed belt.

In another embodiment of the invention, the coil core has an annular design and the transport path of the toothed belt runs through an inner opening in the coil core belt.

This design ensures a particularly high efficiency of induction and energy transfer from the primary coil to the tension member as a secondary coil and provides only a few stray fields in the region of the transformer arrangement. A problem of the accessibility of the toothed belt guided through the coil core can be reduced in that the coil core is constructed in a plurality parts and can be partially dismantled so that the toothed belt can be introduced into the coil core and possibly also removed again.

A complete enclosure of the toothed belt by the coil core in the form of a classic closed toroidal core of a transformer ensures the best induction effect, but it has been shown that even portions of such a toroidal core near the toothed belt can be sufficient to ensure the induced voltage and available power for the electronic component.

In a preferred embodiment, the coil core is U-shaped and the transport path of the toothed belt extends between the free legs of the coil core, so that the toothed belt is arranged, at least in portions, between the free legs.

Such an arrangement makes it possible to pull the coil core laterally from the toothed belt at any time, the toothed belt being moved in the direction of the open side of the coil core. Maintenance access or a change of the toothed belt is also possible in a particularly simple manner.

The invention will now be explained in more detail with reference to the accompanying drawings.

Figure 1:
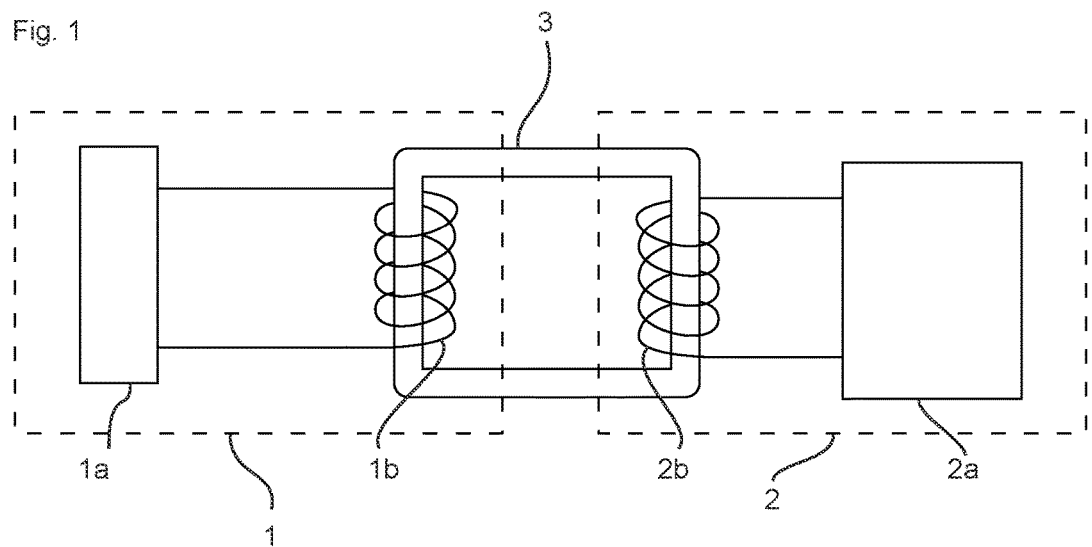
FIG. 1 shows schematically a transformer coupling between a toothed belt according to the invention and a supply arrangement.

In FIG. 1, a toothed belt 1 is shown schematically which is coupled to a supply arrangement 2 according to the transformer principle. The supply arrangement 2 has an AC voltage source 2a and a supply coil 2b, which is coupled to the AC voltage source 2a. An annular coil core 3 extends through the supply coil 2. In this arrangement, the supply coil 2 acts as the primary coil of a transformer with the coil core 3.

The secondary coil is formed within the toothed belt 1. In the toothed belt 1, an electronic component 1a is arranged which contains a sensor, in particular a temperature sensor or an acceleration sensor. In the toothed belt 1, a secondary coil of the transformer arrangement is formed by the tension member 1b, which both absorbs the tensile load of the toothed belt and forms the secondary coil of the transformer for the inductive supply. For this purpose, the coil core 3 extends through the windings of the secondary coil, which are formed by the tension member 1b. In this way, an inductive voltage coupling is carried out in the toothed belt 1, whereby the electronic component 1a is supplied with AC voltage. A rectifier arrangement can be arranged in the electronic component 1a in order to convert the AC voltage into a DC voltage. In addition, further electronic components, for example wireless communication devices, energy storages and further sensors, can be present.

Figure 2:
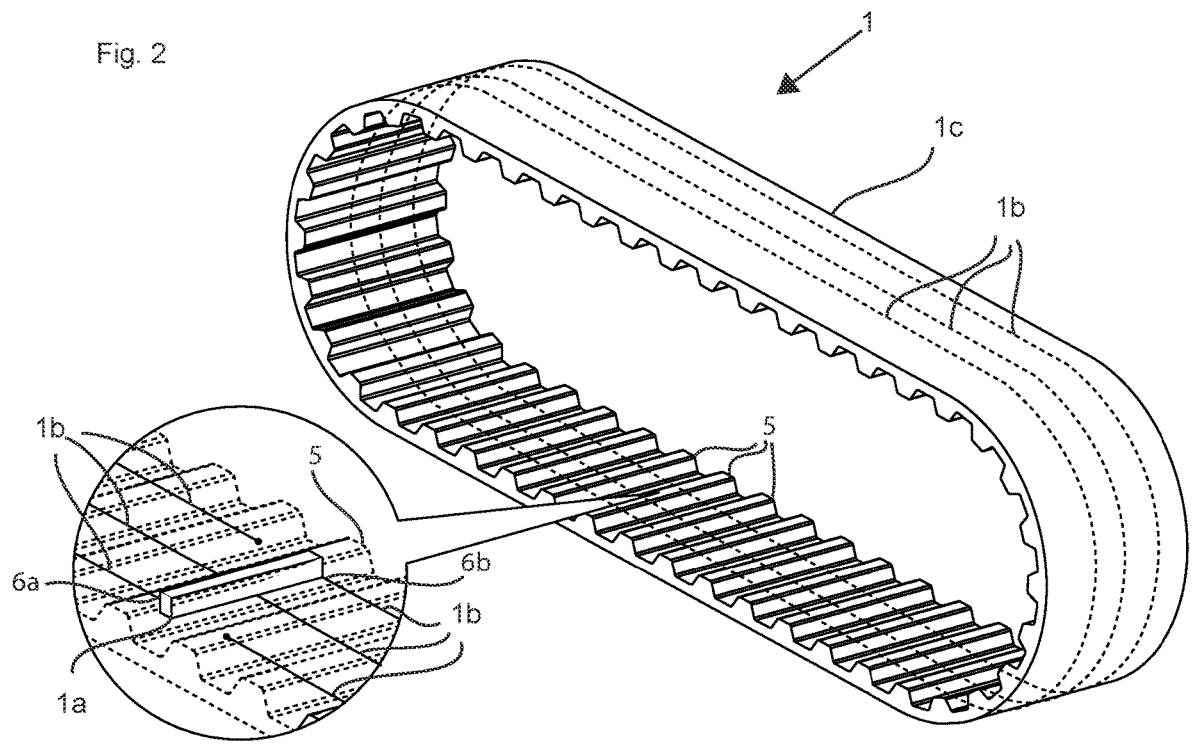
FIG. 2 is a perspective view of an embodiment of a toothed belt according to the invention.

FIG. 2 shows a perspective view of an embodiment of a toothed belt 1 according to the invention. The toothed belt is designed as an endless toothed belt, the teeth of the toothed belt being formed at regular intervals in the plastics material matrix 1c of the toothed belt on its inwardly facing side. A tension member 1b runs in a helical manner within the plastics material matrix 1c of the toothed belt 1 and in this way forms a secondary coil having a plurality of windings. The electronic component 1a is accommodated in a tooth 5 of the toothed belt 1, as the enlarged detail in FIG. 2 shows. The electronic component 1a, which contains at least one sensor, is coupled to the tension member 1b via at least two tapping points 6a, 6b, while the center portion of the tension member 1b runs without contact under the electronic component 1a. In this way, a secondary coil is formed by the tension member 1b, which is coupled to the electronic component 1a for energy supply. This arrangement is suitable for applying voltages coupled to the electronic component 1a via the taps 6a, 6b in accordance with the transformer principle.

In a modification (not shown), it is also possible to couple the tension member with more than two taps to the electronic component, for example, to bridge failing portions of the tension member if necessary or to produce a plurality of voltage taps to separate windings of the tension member.

Figure 3:
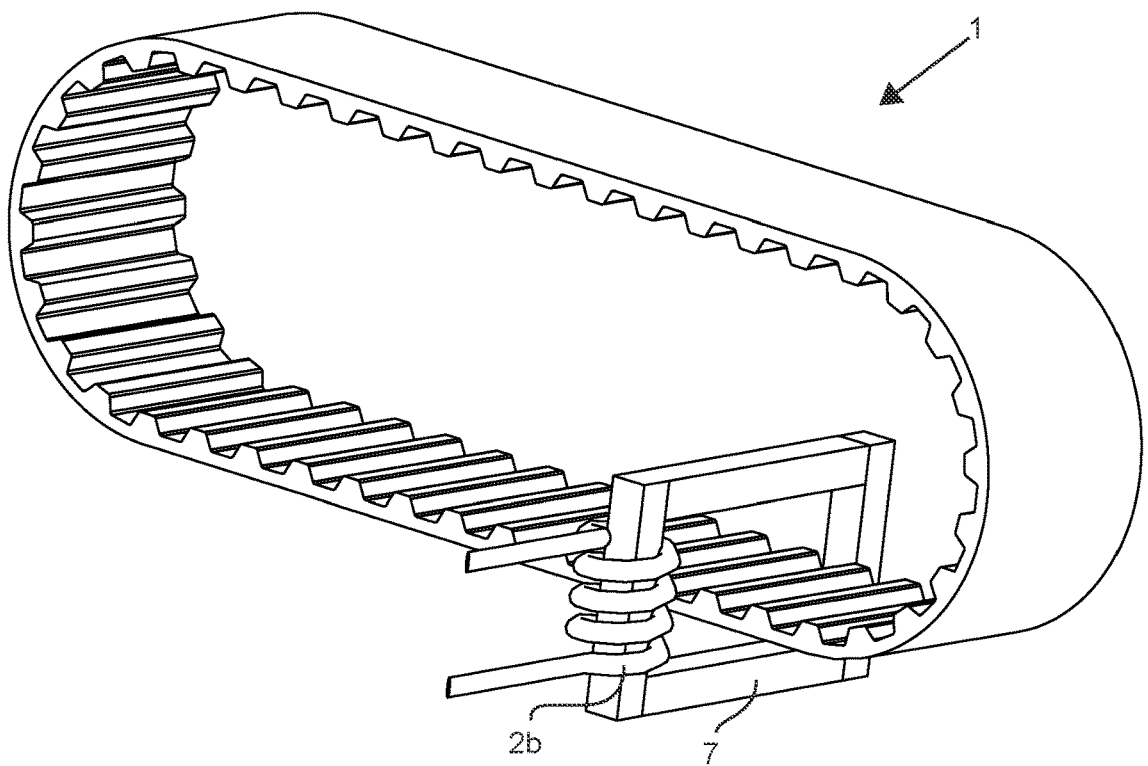
FIG. 3 shows the toothed belt from FIG. 2 having a primary coil arrangement having an annular coil core.

FIG. 3 shows the toothed belt from FIG. 2, a primary coil 2b being provided with an annular coil core 7. The toothed belt 1 runs through the inner opening of the coil core 7. Since the magnetic flux of the primary coil 2b, which is coupled to a supply voltage, runs largely through the coil core 7, there is an intensive transformer coupling between the primary coil 2b and the tension member 1b, which runs in the toothed belt 1 (see FIG. 2).

Figure 4:
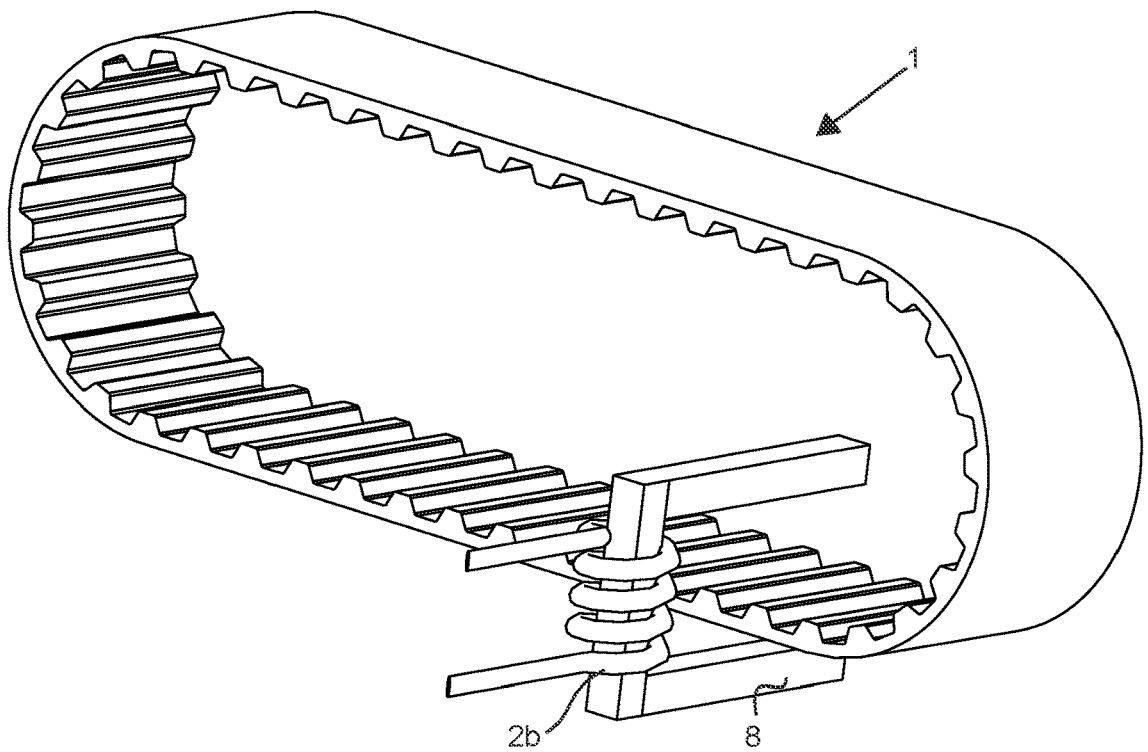
FIG. 4 shows the coil from FIG. 2 having a primary coil arrangement having a U-shaped coil core.

In FIG. 4, a modified arrangement is shown. In this arrangement, the coil core 8, which extends through the primary coil 2b, is designed as a U-shaped coil core 8. In this design, too, a coupling according to the transformer principle is achieved, a somewhat lower inductive coupling being provided, but better mechanical accessibility of the toothed belt being achieved. It can be seen in FIG. 3 that the coil core 8 can be pulled off the toothed belt without any problems without having to make structural changes.

The invention claimed is:

1. A toothed belt having at least one tension member and a plastics material matrix which at least partially encases the tension member,
   wherein the at least one tension member extends in the plastics material matrix in a running direction of the toothed belt and wherein teeth of the toothed belt are formed transversely to the running direction in the plastics material matrix,
   wherein the tension member is formed from an electrically conductive material and wherein the plastics material matrix is formed from an electrically insulating material,
   wherein the toothed belt has at least one electronic component which is embedded in the plastics material matrix and has at least one sensor which detects data on a condition parameter of the toothed belt,
   wherein
   the at least one electronic component is coupled to the tension member via at least two voltage taps, in order to tap a voltage induced in the tension member to supply the at least one electronic component with power.

2. The toothed belt according to claim 1, wherein the toothed belt is designed as an endless toothed belt.

3. The toothed belt according to claim 1, wherein the at least one electronic component is arranged in one of the teeth of the toothed belt.

4. The toothed belt according to claim 1, wherein the electronic component has at least one temperature sensor and/or at least one acceleration sensor.

5. The toothed belt according to claim 1, wherein the electronic component has a wireless communication device which transmits data from the sensor in an electromagnetic communication signal.

6. The toothed belt according to claim 1, wherein the at least one electronic component has an energy storage and a charging circuit in order to charge the energy storage under voltage supply by the induced voltage in the tension member.

7. The toothed belt according to claim 1, wherein the tension member in the plastics material matrix has a plurality of revolutions along the running direction and thereby extends along a helical line around an axis transverse to the running direction, so that a coil having a plurality of windings is formed in the plastics material matrix by the tension member.

8. An arrangement having a toothed belt according to claim 1,
wherein the toothed belt is coupled to a drive and is clamped along a transport path,
wherein, along the transport path and adjacent to the toothed belt, an excitation device is arranged which generates an alternating magnetic field which at least partially extends through the toothed belt.

9. The arrangement according to claim 8, wherein the excitation device is designed as an AC voltage supplied supply coil and is arranged in a stationary manner, wherein the supply coil has a coil core,
wherein the coil core encompasses or engages, at least in portions, over or under the toothed belt along the transport path, so that a transformer arrangement is formed by the supply coil, the coil core, and the tension member.

10. The arrangement according to claim 9, wherein the coil core is U-shaped and the transport path of the toothed belt runs between the free legs of the coil core, so that the toothed belt is arranged, at least in portions, between the free legs.

11. The arrangement according to claim 9, wherein the coil core has an annular design and the transport path of the toothed belt runs through an inner opening of the annular coil core.

\* \* \* \* \*